United States Patent
Poole et al.

(10) Patent No.: US 9,355,399 B1
(45) Date of Patent: *May 31, 2016

(54) SYSTEM AND METHOD FOR PROVIDING CONTACTLESS PAYMENT WITH A NEAR FIELD COMMUNICATIONS ATTACHMENT

(71) Applicant: Capital One Financial Corporation, McLean, VA (US)

(72) Inventors: Thomas S. Poole, Chantilly, VA (US); Paul Young Moreton, Glen Allen, VA (US)

(73) Assignee: CAPITAL ONE FINANCIAL CORPORATION, McLean, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,009

(22) Filed: Oct. 5, 2015

Related U.S. Application Data

(63) Continuation of application No. 14/156,941, filed on Jan. 16, 2014, now Pat. No. 9,177,312, which is a continuation of application No. 13/538,468, filed on Jun. 29, 2012, now Pat. No. 9,183,491, which is a continuation of application No. 13/441,505, filed on Apr. 6, 2012, now Pat. No. 9,183,490.

(60) Provisional application No. 61/570,275, filed on Dec. 13, 2011, provisional application No. 61/547,910, filed on Oct. 17, 2011.

(51) Int. Cl.
*H04B 5/00* (2006.01)
*G06Q 20/32* (2012.01)
*G06Q 20/20* (2012.01)

(52) U.S. Cl.
CPC .......... *G06Q 20/3278* (2013.01); *G06Q 20/202* (2013.01); *G06Q 20/3226* (2013.01); *H04B 5/0031* (2013.01)

(58) Field of Classification Search
CPC .................. H04B 5/00; H04B 5/0025–5/0031; G06Q 20/327–20/3278; G06K 19/07769
See application file for complete search history.

(56) References Cited

U.S. PATENT DOCUMENTS

| | | | |
|---|---|---|---|
| 4,062,635 | A | 12/1977 | Teh-Sheng |
| 2007/0155430 | A1 | 7/2007 | Cheon et al. |
| 2007/0188323 | A1 | 8/2007 | Sinclair et al. |
| 2008/0011837 | A1 | 1/2008 | Wesley |
| 2008/0019131 | A1 | 1/2008 | Takei et al. |
| 2008/0150679 | A1* | 6/2008 | Bloomfield ............ B60R 25/24 340/5.7 |
| 2008/0162361 | A1 | 7/2008 | Sklovsky et al. |

(Continued)

OTHER PUBLICATIONS

Notification of Transmittal of The International Search Report and The Written Opinion of the International Searching Authority from Application No. PCT/US2015/32931 dated Oct. 28, 2015.

*Primary Examiner* — Gennadiy Tsvey
(74) *Attorney, Agent, or Firm* — Hunton & Williams LLP

(57) ABSTRACT

A system and method in accordance with exemplary embodiments may include an attachment with a near field communication antenna, a secure element, a plug capable of connecting the attachment to an audio jack on a mobile device. Further, a system and method in accordance with exemplary embodiments may include receiving a payment initiation instruction from a customer, using a near field communication antenna, sending payment information to a point of sale device, using one or more computer processors, encoding data related to the payment as audio data, and transmitting the data related to the payment through an audio jack.

18 Claims, 12 Drawing Sheets

(56) References Cited

U.S. PATENT DOCUMENTS

| | | |
|---|---|---|
| 2008/0183559 A1 | 7/2008 | Frazier et al. |
| 2008/0224825 A1 | 9/2008 | Nystrom et al. |
| 2008/0238610 A1 | 10/2008 | Rosenberg |
| 2009/0069050 A1 | 3/2009 | Jain et al. |
| 2009/0144456 A1 | 6/2009 | Gelf et al. |
| 2009/0266884 A1 | 10/2009 | Killian et al. |
| 2009/0307140 A1 | 12/2009 | Mardikar |
| 2010/0125508 A1 | 5/2010 | Smith |
| 2010/0151790 A1 | 6/2010 | Hoeksel et al. |
| 2010/0184479 A1 | 7/2010 | Griffin, Jr. |
| 2011/0312270 A1 | 12/2011 | White |
| 2013/0191227 A1 | 7/2013 | Pasa et al. |
| 2013/0246259 A1 | 9/2013 | Dessert |
| 2013/0288598 A1 | 10/2013 | Parkin |
| 2014/0074698 A1 | 3/2014 | Poole et al. |

\* cited by examiner

SYSTEM AND METHOD FOR PROVIDING CONTACTLESS PAYMENT WITH A NEAR FIELD COMMUNICATIONS ATTACHMENT

CROSS-REFERENCE OF RELATED APPLICATIONS

The subject application is a Continuation Application of U.S. application Ser. No. 14/156,941, filed Jan. 16, 2014, which is a continuation application of U.S. patent application Ser. No. 13/538,468, filed Jun. 29, 2012, which is a continuation application of U.S. patent application Ser. No. 13/441,505, filed Apr. 6, 2012, which claims priority to U.S. Provisional Application Nos. 61/570,275 filed Dec. 13, 2011, and 61/547,910, filed Oct. 17, 2011, the contents of which are incorporated herein by reference in their entirety.

FIELD OF THE DISCLOSURE

The present disclosure relates to systems and methods for providing contactless payment with a Near Field Communications attachment.

BACKGROUND OF THE DISCLOSURE

Near Field Communications, or NFC, allows for wireless communication between two devices in close proximity to each other. Existing NFC devices provide limited functionality for contactless payments using a "digital wallet," but are restrictive and difficult to implement for a number of reasons.

Current digital wallet solutions require channeling all transactions through a defined group of stakeholders, thus increasing cost and complexity of each transaction. Further, current digital wallet solutions require that a mobile device be pre-manufactured with specific hardware already included, thus excluding hundreds of millions of existing devices from using a digital wallet solution. These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

Figure 1:
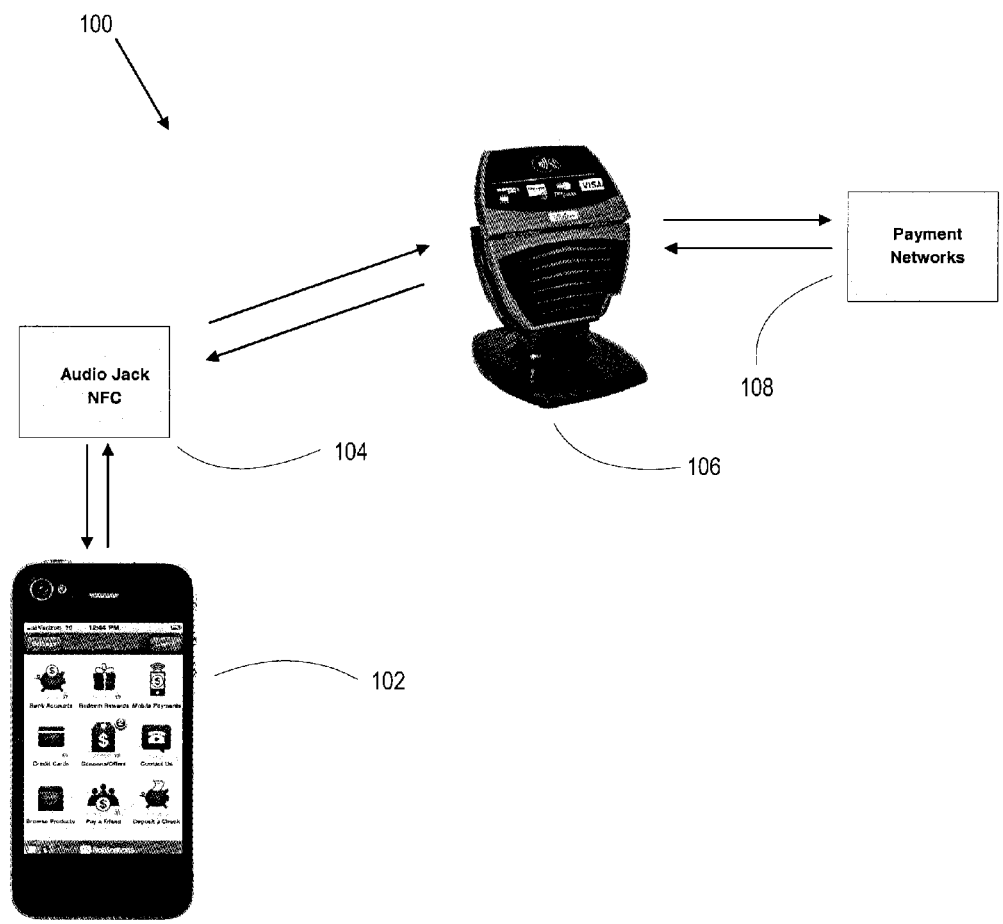
FIG. 1 depicts an exemplary embodiment of a contactless payment system.

The following description is intended to convey a thorough understanding of the embodiments described by providing a number of specific exemplary embodiments and details involving systems and methods for providing contactless payment with a NFC attachment. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in various embodiments, depending on specific design and other needs. A financial institution and system supporting a financial institution are used as examples for the disclosure. The disclosure is not intended to be limited to financial institutions only.

According to the various embodiments of the present disclosure, systems and methods enable an approach to contactless payments using an attachment to a mobile device. Such attachments may include, for example and not by way of limitation, a contactless payment attachment that plugs into an audio jack or plug of a mobile device. The exemplary use of "mobile device" throughout the application is only by way of example, and the attachment may also be used with personal computers, automobiles, televisions, gaming systems, or any other device capable of making an audio jack connection. The attachment may also plug into any jack of a mobile device capable of transmitting audio and/or data information, for instance, a 2.5 mm audio jack, a 3.5 mm or ⅛ inch audio jack, a multipronged audio jack, or other audio connection. The attachment may also utilize various other connections available on mobile devices, for example, mini-USB, micro-USB, memory card slots, or proprietary ports such as, for example, a dock connector on a mobile device, (e.g. the dock connector on an Apple iPhone®, iPod® or iPad®). In various embodiments, the attachment approach to contactless payment could be provided in an online environment, whereby, for example, a mobile device (such as a smartphone, audio player, tablet, or other mobile device) with an attachment according to the various embodiments could send and receive data via a communication network sufficient to enable a contactless transaction, including a contactless payment transaction. The attachment could also be used in an offline manner, whereby an attachment could connect to the mobile device alone and used, regardless of whether the mobile device is connected to a communication network at the time of use. This attachment could eliminate the need for a consumer to purchase a mobile device with special hardware, enable a user to quickly and cost-effectively add contactless payment features to their mobile device, and/or enable a user or financial institution to bypass traditional stakeholders in the payment process.

The attachment may be, for example and not by way of limitation, an audio plug/jack based attachment for mobile devices, smartphones, or other personal digital assistants (e.g. tablet computers, music players, etc.) In one embodiment, this attachment may be operable with any mobile device, PDA class device or smartphone that includes an audio jack or plug. The mobile device may run software or firmware (for example, an 'app') that works with the dongle to enable mobile payments. The attachment may perform similar functions to existing digital wallet solutions without the trouble of strict hardware requirements or needing to use a specific intermediary for a transaction. The attachment may provide a pass-through or other addition to provide traditional audio functionality (music, calling, etc.) while the attachment is in use. In some embodiments, the attachment may allow the pass-through audio signal to be suspended or terminated during use of the NFC portion of the attachment.

In an exemplary embodiment, the attachment may be either self-powered or powered by the mobile device that it may be attached or otherwise connected to. In one embodiment, the attachment may plug into or otherwise connect to a personal computer or other source for initial provisioning of payment credentials. In an embodiment, NFC secure element provisioning may occur prior to issuance of the attachment. For example, a user may provision an attachment once the attachment is obtained by the user. A user may contact a financial institution, who will then activate the attachment. The attachment may be activated by standard methods, including but not by way of limitation, using a trusted service manager (TSM), Know Your Customer (KYC), through the mobile device, over the phone, or other provisioning process. In one embodiment, the provisioning may be completed before the user obtains the attachment. Additionally, the attachment may be provisioned for multiple financial accounts. This may be completed by provisioning the device to store each account or by using the mobile device to re-provision the attachment each time a purchase is desired with a different account. The provisioning process may securely pass encrypted credit card details or other credentials to the secure element, such as the credit card account number, expiration date, and other track data.

Also, an attachment may be provisioned for credit cards, debit cards, prepaid cards, or any other payment vehicle available to customers, companies, or financial institutions. The attachment may be provisioned with or without user interaction, by the customer or financial institution, and any other acceptable method of provisioning. The attachment may be provisioned "over-the-air" or via a wireless or wired connection. The provisioning may occur by receiving a signal from a trusted service manager (TSM).

In an exemplary embodiment, the attachment may contain an NFC antenna and secure element (SE). The SE may be a hardware chip specially designed to be tamper proof. In one embodiment, the SE may be used for digitally and physically secure storage of sensitive data, including payment data, health records, car key identifiers, etc. The SE may, for example, store information related to a person, customer, financial institution, or other entity. In certain implementations, the SE may also store information related to a financial account, such as, for example, a credit card number, debit account number, or other account identifier. The SE may include a computer processor or other computational hardware or software. As one example, the secure element may contain the Visa® and MasterCard® applications for PayWave® and PayPass® transactions.

The Secure Element may have the ability to securely store various credentials. In one embodiment, the credentials may comprise credit card information. The credentials may expand beyond credit card payment info for use over NFC. As one example, the information stored on the Secure Element may be used to auto-complete on-line checkouts or enable purchases in other, third party applications. The Secure Element may also store keys, building access information, drivers licenses, passwords, loyalty card information, gift card information, transaction history, reward information, ATM access information, addresses, documents, pictures, or other data objects. The secure element may be capable of generating a Dynamic Card Security Code, such as a Dynamic Card Verification Value (CVV3) or other security code.

The attachment may also take on multiple different form factors, including but not by way of limitation, those forms that have sufficient space for company branding or logos. The attachment may take any shape capable of acting as an attachment. The attachment may be made as small as possible to be unobtrusive, or be made to have one or more dimensions similar to the mobile device it is attached to. In an exemplary embodiment, the attachment may be square or have any other shape or ornamental design.

In an exemplary embodiment, the attachment may include software and application programming interfaces (APIs) to enable remote and local provisioning of the SE, use of NFC antenna, payments enablement, and attachment security management (e.g. long range deactivation). In an exemplary embodiment, the system may include a user interface and software for an associated user access to uses of the SE, the NFC antenna, and any other portion of the attachment for use in any manner of application desired by user or intended for by issuer. The system and software may allow for multiple cards, accounts, or other information portions to be stored in the secure element and may allow simultaneous access to all, or switch between the individual options.

In an embodiment, the system may include an application and/or user interface that enables end user control for NFC transmission of payment data through an audio plug. The application may operate on the mobile device or on an external controller or device. Also, the system may include APIs that allow access to the NFC antenna and secure element for enabling, disabling, locking, initial provisioning, updates, emergency turnoff, and other operations. The attachment may be provisioned to store information for multiple accounts, multiple cards, loyalty cards, or any other financial information. The attachment may require a payment initiation action enable the attachment for use. For example, the attachment may require a user to enter a PIN code or other identifying information to enable the attachment for user. Additionally, the attachment may stay 'unlocked' and a payment initiation action may comprise a user bumping, touching, or otherwise holding or positioning the device near a sensor. The attachment may then 'lock' after use or after a certain time after enabling. In one exemplary embodiment, the attachment may provide a physical switch, button, or other way to enable or unlock the attachment. For example and not by way of limitation, a user may press a button and enter a PIN code in order to activate or unlock the attachment. Additionally, the physical switch or button may be used in place of a PIN code or other functionality. Additionally, the device may use any other type of unlocking or enabling the attachment, for example and not by way of limitation a physical gesture, touch, or swipe motion by a user. Also, the system may permit the use of a cryptographic protocol (e.g. secure sockets layer) to establish a secure channel for data transmission. Upon a transaction, the attachment may transmit information regarding the transaction through the audio jack to the mobile device.

The application and user interface may leverage transaction data gained from the attachment, wireless data connection, over-the-air data connection, or other means of data transmission. For example, the application and user interface may leverage information about the products and/or services being purchased, information about the account or the account holder, information about the merchant and/or other parties involved in a transaction, rewards information, promotional information, advertising information, or other useful information.

In an exemplary embodiment, the system may provide capability to securely enable an attachment through hardware identifiers like the UDID (e.g. device ID on an Apple iPhone or other mobile device). For example, upon obtaining an attachment, a user may 'pair' that attachment with a specific device by programming the attachment with a hardware identifier, thus ensuring that the attachment can only be used with that device. In some embodiments, the user may 'pair' an attachment with multiple devices, or change the pairing of an attachment. Also, the system may add authentication layers by utilizing embedded serial numbers, location-based analytics, transaction count mechanisms, and other layers intended to avoid sniffing or otherwise compromising the secure payment capabilities. Also, the system may lock the attachment or otherwise prevent some or all functionality if the attachment disconnected from an audio jack.

In an exemplary embodiment, software on the mobile device may be partially or wholly locked or disable if the attachment is removed. For example and not by way of limitation, a user may not be permitted to make a certain higher-risk financial transaction, such as a balance transfer, without the attachment plugged in. In this way, the attachment may be used as an added layer of physical security for operations on the mobile device.

The connection between the mobile device and attachment may serve to transmit power sufficient to power the NFC antenna, the secure element, or any part of the attachment or the entire attachment through the audio jack/plug of the mobile device. Also, the connection may include a process to provision a secure element through audio jack/plug. Also, the connection may include a process for binding an audio jack/plug to one or more specific phone identifiers i.e. UDID (Unique Device ID).

In an exemplary embodiment, the system may enable Industry Standard NFC Payment Transmission. For example, the attachment may enable two loop antennas to form an air-core transformer when placed near one another by using magnetic induction. The system may operate at 13.56 MHz or any other acceptable frequency. Also, the attachment may provide for a passive communication mode, where the initiator device provides a carrier field, permitting answers by the target device via modulation of existing fields. Additionally, the attachment may also provide for an active communication mode by allowing alternate field generation by the initiator and target devices.

In an exemplary embodiment, the attachment may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

In an exemplary embodiment, the attachment may be capable of utilizing standardized transmission protocols, for example but not by way of limitation, ISO/IEC 14443 A/B, ISO/IEC 18092, MiFare, FeliCa, tag/smartcard emulation, and the like. Also, the attachment may be able to utilize transmission protocols and methods that are developed in the future using other frequencies or modes of transmission. The attachment may also be backwards-compatible with existing payment techniques, for example RFID. Also, the system may support transmission requirements to meet new and evolving payment standards including internet based transmission triggered by NFC. In one embodiment, the attachment in conjunction with the software may utilize PayPass or PayWave systems to enable transactions.

In one embodiment, the attachment may include a magnetic stripe reader for intaking data from credit cards, debit cards, gift cards, loyalty cards, identification cards, and any other object utilizing a magnetic stripe.

In an exemplary embodiment, the attachment may be used to provide offers to a user. These offers may be related to transactions made with the attachment, and may include discounts, advertising, coupons, or any other offer. The offers may also be based on transaction history, frequency, or location. The offers may also be based on a user's indicated desires or the location of a user. Information related to the offer may be received from the NFC antenna or over any other data connection. For example, a user could use the attachment to purchase a pair of pants and the attachment and software, alone or in combination with a point of sale (PoS) device could present an advertisement or offer to purchase a matching shirt, belt, and/or socks. The PoS device may transmit purchase information to the attachment, which may then transmit the information to the phone. The software may utilize the phone's data connection to download additional information or offers. As an example and not by way of limitation, the software may automate post-transaction purchases via an online merchant—(e.g. cables from an online retailer may be promoted or offered following a purchase at a large retail store), and optionally provide a user an option to select a related product the user would like to purchase from a list of options—this may provide a reduced merchandise selection that is presumably more relevant. Additionally, the offers may be selected by incorporating information from other sources, for example using previously shown offers, past user transactions, consumer preference settings, geographic travel patterns, or any other information. The offers may also be presented when transactions are identified through other methods, such as using scanned receipts, photographs of a purchased products, downloaded transaction records, or other ways to identify a product or service purchased by a user. The software may further present a display the effect of an offer to a user's statement in real-time, or either before or after the offer is accepted or rejected.

In an exemplary embodiment, the software in conjunction with the attachment may present information to a user. Also, the information may be related to a recent transaction. In some embodiments, the software may present a related or complementary product advertisement. Also, the software may present offers or follow-on pitches related to a purchase or transaction. Additionally, the software may provide budgeting information, credit limit information, alternative warranty offers, and/or alternative purchase terms such as an offer for a payment plan or dynamic term loan for a given purchase. The software may also allow downloads and/or presentation of additional materials related to a transaction, such as receipts, warranty information, and/or product manuals. The software may allow for real-time use of reward points and/or card-linked offers, (e.g. "spend [x] and we'll take [$y] off your credit card statement"), and may allow for a real time message broadcast notifying the user of any savings.

In one embodiment, the software in conjunction with the attachment may provide budgeting functionality. The software may provide real-time information to a user regarding transactions made with the attachment or other transactions, for example, the software may display to a user the amount of money spent in a given category or at a given location.

In an exemplary embodiment, the software and attachment may provide for process for determining an offer of installment lending related to a transaction from the mobile phone. For example, the software and attachment may, when a user makes a transaction, offer the user an installment loan to cover that purchase. This loan may differ from terms of any other credit account the user possesses. The offer may emphasize dynamic loan terms, such as duration, rate, or eligibility based on creditworthiness, including links to credit card statement data and other account information as the basis for underwriting.

In an exemplary embodiment, the software and attachment may allow for social networking functionality. In some embodiments, a user may "check-in" to a location without making a purchase by using the attachment to transmit data to/from a PoS-like "check-in station" at a location. Also, the software may enable social network updates, postings, or other functionality based on a "check-in" or purchase.

In another embodiment, the software and attachment may allow a number of options to a user. For example, the software and attachment may provide a user the option to the user to use Financial institution transaction history; Loyalty cards; On-line mobile commerce; Deals/Offers; Coupons; Gift Cards; Insurance Cards; Store Passwords; Provisioning for other credit cards; Driver's licenses; Peer to Peer payments—tap two attachments together to transfer payment; Check in when you enter the store; Social Media check in, notice of what was bought, etc.; Product information from tapping on an item; Real time display of upsell and cross sell items; Warranty Upsell (optionally utilizing SKU-level data); Manuals for product (optionally utilizing SKU-level data); Receipts (optionally utilizing SKU-level data); and/or Accepting NFC payments.

In an exemplary embodiment, the attachment may not require a PoS system to make an NFC payment. As one example, the attachment may allow a user to make contact with another attachment or like device in order to complete a payment. The attachment may be used in this way to allow the user to make a transaction with a commercial entity or another user. As one example, a user may repay an amount borrowed from another user by "bumping," or bringing two attachments near one another.

In an exemplary embodiment, the NFC attachment may enable the payments through network data transmission over the air or through standard terminal routing. For example, the attachment may use NFC or other mode of communication as a trigger for an internet based payment, wire transfer, electronic funds transfer, or other financial transaction.

In an exemplary embodiment, the attachment may work in conjunction with a token-based payment solution. The token may be transmitted through the above-detailed near field communications method or by any other suitable method, such as barcode or quick response code scanning. Closed loop verification may be enabled by allowing a financial institution to both issue the token and approve the transaction. Such embodiments may provide, for example, a token-based, dynamic solution to contactless payments. In various embodiments, the token-based solution could be provided in an online environment, whereby, for example, a mobile device such as a smartphone could receive a token in "real-time" via a communication network. The token-based solution could also be used in an offline manner, whereby a previously-provided token could be used for a certain period of time, regardless of whether the smartphone is connected to a communication network at the time of use. In effect, the tokens could serve as single-use, or limited-use credit card numbers.

The token-based solution could also allow credit-card issuers, for example, or any other token-issuer to set different types of parameters around the token. For example, transaction limits, use limits, time limits, and the like could be applied to the tokens. In other words, exemplary tokens could apply only to transactions of $100 or less, and/or only to 3 separate transactions before it expires, and only for 3 days. The attachment may operate without utilizing tokens.

FIG. 1 depicts an exemplary system 100 for use with the attachment solution for contactless payment. As depicted in FIG. 1, system 100 may include a mobile device 102. Mobile device 102 may be any mobile device capable of executing the software-based solution for contactless payment. For example, mobile device 102 could be an Apple iPhone®, iPod® or iPad®, or any other mobile device running Apple's iOS operating system, any device running Google's Android® operating system, any music player, any device running Microsoft's Windows® Mobile operating system, and/or any other smartphone or like device.

Mobile device 102 may include, for example, a Subscriber Identity Module (SIM) card and an App Processor. A SIM card may be an integrated circuit that securely stores the service-subscriber key (IMSI) used to identify a subscriber on mobile telephony devices (such as mobile phones and computers). Mobile device 102 may connect to attachment 104. This attachment may be by way of a plug-in connection to an audio jack on the mobile device 102. Information may be transmitted from the attachment to the device by encoding the transaction data as audio data and sending through the connection to be received by the mobile device's microphone. Processors within the mobile device may then process the data as appropriate, by decoding the data, encrypting the data, sending the data to a third party, storing the data, or other appropriate operation as needed. The attachment 104 may contain an embedded NFC chip that can send encrypted data a short distance ("near field") to a reader 106 located, for instance, next to a Point of Sale (PoS) device or like retail cash register that enables contactless payments. An app processor (not shown) may enable execution of software applications on mobile device 102. In one embodiment, the app processor may be a computer processor or other processing device adapted for use in a mobile device. In various embodiments, app processor may cooperate with attachment 104 to enable contactless payment using mobile device 102. In various exemplary embodiments, the hardware contained in the attachment 104 may be partially or wholly redundant with the hardware inside the mobile device 102. Reader 106 may then communicate or otherwise transfer the data to and from payment networks 108. This transfer may be performed through a wireless connection, "over-the-air" connection, wired connection, or through standard terminal routing.

Figure 2:
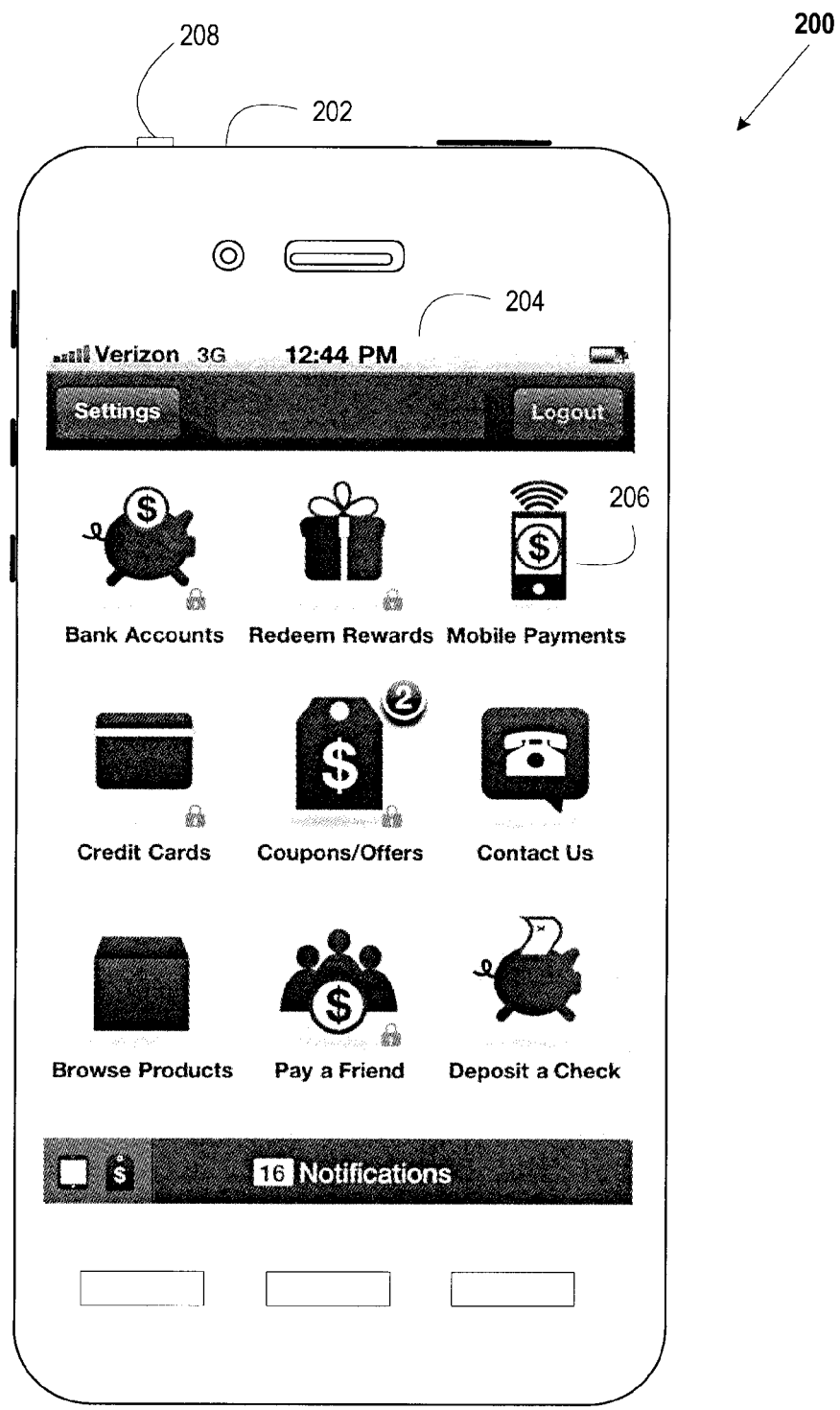
FIG. 2 depicts an exemplary embodiment of a contactless payment system.

FIG. 2 depicts an exemplary system 200 for use with the attachment solution for contactless payment. System 200 may include a mobile device 202. Mobile device 202 may include a display 204 which may display a user interface, including software applications, executing on mobile device 202. By way of a non-limiting example, the software applications executing on mobile device 204 may include a mobile payments application 206. In various exemplary embodiments, mobile payments application 206 may enable a user to interact with and control the attachment. A user may select mobile payments application 206, by for example, touching display 204, which may then launch or otherwise cause the execution of mobile payments application 206. Mobile device may include an audio jack 208. Audio jack 208 may provide the connection for the attachment.

Figure 3:
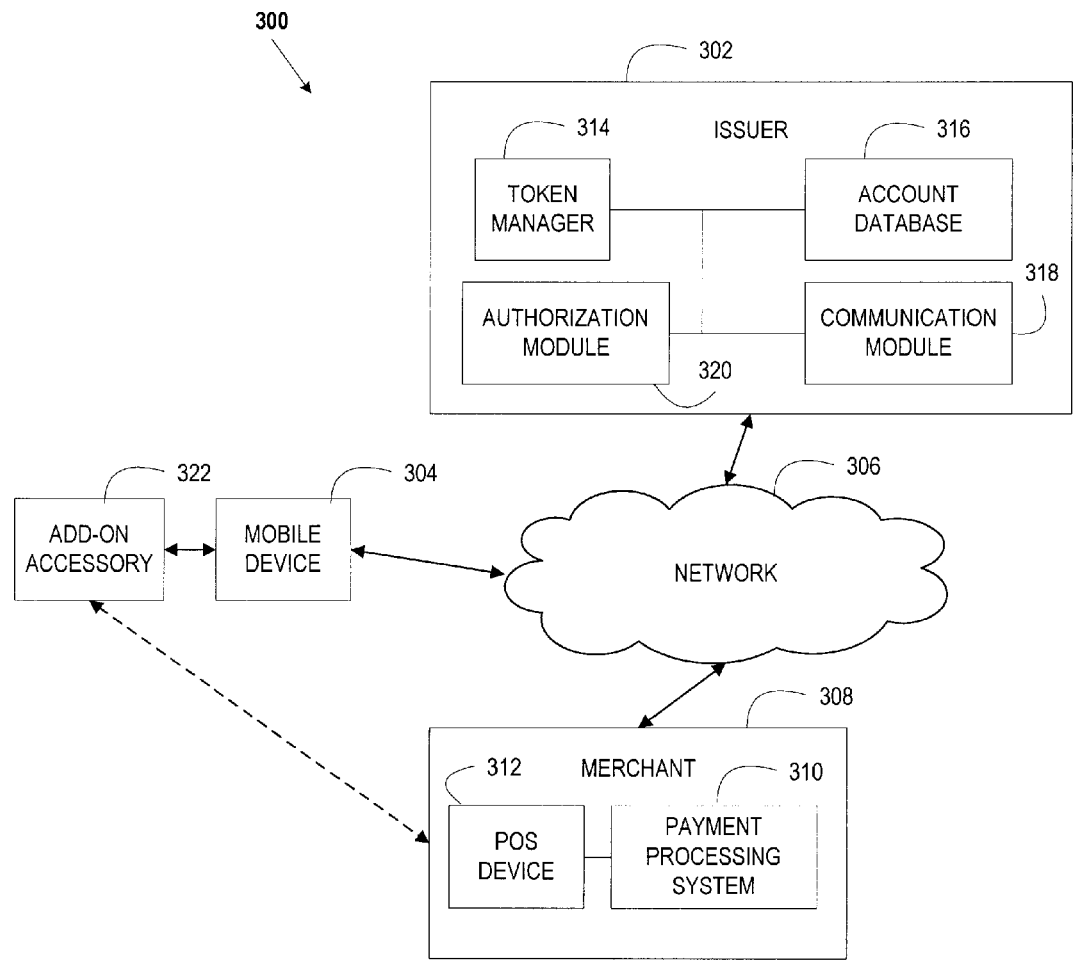
FIG. 3 depicts an exemplary embodiment of a contactless payment system.

FIG. 3 depicts an exemplary system 300 for use with a token-based software solution for contactless payment that may also enable NFC contactless payment. System 300 may include an issuer system 302, a mobile device 304, an attachment 322, a network 306, and a merchant system 308. In various embodiments, mobile device 304 may be similar to those described above with respect to FIGS. 1 and 2.

Network 306 may enable communication between mobile device 304, issuer 302, and merchant 308. For example, Network 306 may be one or more of a wireless network, a wired network or any combination of wireless network and wired network. For example, network 306 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 306 may include, without limitation, telephone lines, fiber optics, IEEE Ethernet 902.3, a wide area network ("WAN"), a local area network ("LAN"), or a global network such as the Internet. Also network 306 may support an Internet network, a wireless communication network, a cellular network, or the like, or any combination thereof. Network 306 may further include one network, or any number of the exemplary types of networks mentioned above, operating as a stand-alone network or in cooperation with each other. Network 306 may utilize one or more protocols of one or more network elements to which they are communicatively coupled. Network 306 may translate to or from other protocols to one or more protocols of network devices. Although network 306 is depicted as a single network, it should be appreciated that according to one or more embodiments, network 306 may comprise a plurality of interconnected networks, such as, for example, the Internet, a service provider's network, a cable television network, corporate networks, and home networks.

Issuer system 302 may include, for example, a token manager 314, an account database 316, a communication module 318, and an authorization module 320. Token manager may generate, maintain, and provide information relating to the tokens used in the software-based solution for contactless payments. In various embodiments, token manager 314 may be integrated into issuer system 302 as depicted in FIG. 3. Token manager 314 may also be a third-party system that works in cooperation with issuer system 302 to generate, maintain, and provide tokens for use in the software-based solution for contactless payments. Account database 316 may maintain information relating to the accounts of customers associated with an issuer. As referred to herein, an issuer may include, for example, a credit card issuer, or any other issuer of tokens for contactless payment. These tokens may enable additional security during NFC contactless payment transactions. Account database 316 may also include an association of tokens with respective customers. For example, account database 316 may include an association of a token "123456" with account number "1234 5678 9012 3456," which belongs to John Q. Cardholder. As will be described in more detail below, account database 316 may be accessed for authorizing transactions and or payment requests.

Communication module 318 may enable communication between the components of system 300. Communication module 318 may include hardware, software, and firmware that may enable communication between an issuer system 302 and other components of system 300 using network 306, for example.

Authorization module 320 may include business logic used to determine whether a transaction or payment request should be authorized. For example, authorization module 320 may include executable programs that determine whether the token is associated with the correct mobile device and/or issuer account and whether the token use is within the limiting parameters before authorizing a particular transaction. Authorization module 320 may cooperate with communication module 318 to communicate authorization decisions to merchant 308 and/or mobile device 304.

Merchant 308 may include a Point of Sale (PoS) device 312 and a payment processing system 310. In various embodiments, PoS device 312 may be any device that may receive NFC communication, for example and can be utilized to process payment transactions. PoS device 312 may be for example, PoS devices made by VeriFone® and/or any other like devices. PoS device 312 may permit transmittal, provisioning, issuance, or other similar action with a number of different programs, for example, loyalty and rewards programs, advertising programs, promotional programs, gift programs, etc. For example, PoS device 312 may enable two loop antennas to form an air-core transformer when placed near one another by using magnetic induction. The system may operate at 13.56 MHz or any other acceptable frequency. Also, PoS device 312 may provide for a passive communication mode, where the initiator device provides a carrier field, permitting answers by the target device via modulation of existing fields. Additionally, PoS device 312 may also provide for an active communication mode by allowing alternate field generation by the initiator and target devices.

In an exemplary embodiment, PoS device 312 may deactivate the RF field while awaiting data. PoS device 312 may use Miller-type coding with varying modulations, including 100% modulation. PoS device 312 may also use Manchester coding with varying modulations, including a modulation ratio of 10%. Additionally, PoS device 312 may be capable of receiving and transmitting data at the same time, as well as checking for potential collisions when the transmitted signal and received signal frequencies differ.

In an exemplary embodiment, PoS device 312 may be capable of utilizing standardized transmission protocols, for example but not by way of limitation, ISO/IEC 14443 A/B, ISO/IEC 18092, MiFare, FeliCa, tag/smartcard emulation, and the like. Also, PoS device 312 may be able to utilize transmission protocols and methods that are developed in the future using other frequencies or modes of transmission. PoS device 312 may also be backwards-compatible with existing payment techniques, for example RFID. Also, the system may support transmission requirements to meet new and evolving payment standards including internet based transmission triggered by NFC.

Payment processing system 310 may allow merchant 308 to request and process payments, for example. Payment processing system 310 may utilize network 306 to communicate payment requests to issuer system 302 and receive authorization requests. In doing so, payment processing system 310 may transmit information to issuer system 302 using, for example, networks maintained by Visa®, MasterCard®, Discover®, American Express® and the like. Also, payment system 310 may be capable of communicating token information using data standards defined by the above-described networks. To make a payment with the system, a user may place the attachment 104 near the PoS device 312, thus enabling data transmission via NFC.

Figure 4:
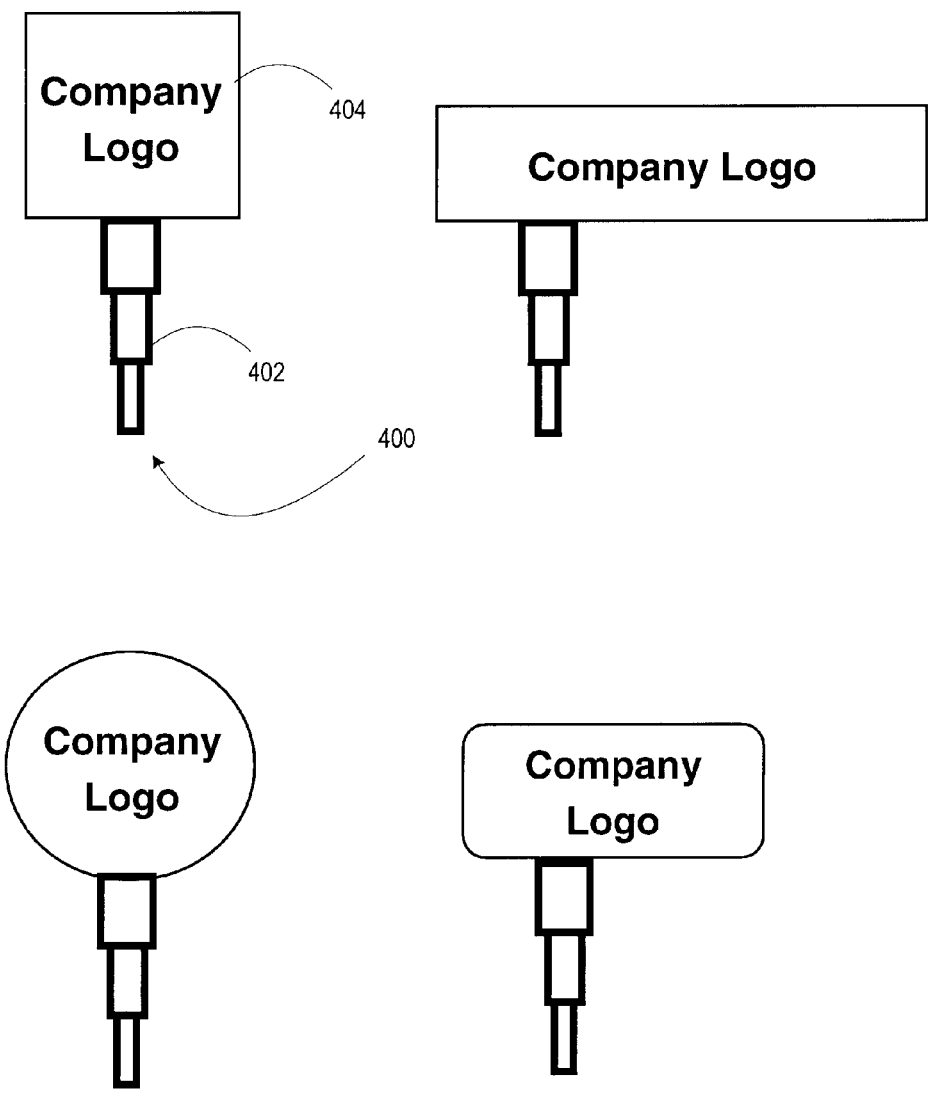
FIG. 4 depicts an exemplary embodiment of a contactless payment system.

FIG. 4 depicts an several exemplary attachments for use with the attachment solution for contactless payment. In one embodiment shown, the attachment 400 may contain a plug 402 and a housing 404. The plug 402 may be adapted to plug into a standard and/or universal audio jack, and may further be configured to transmit and receive data.

Figure 5:
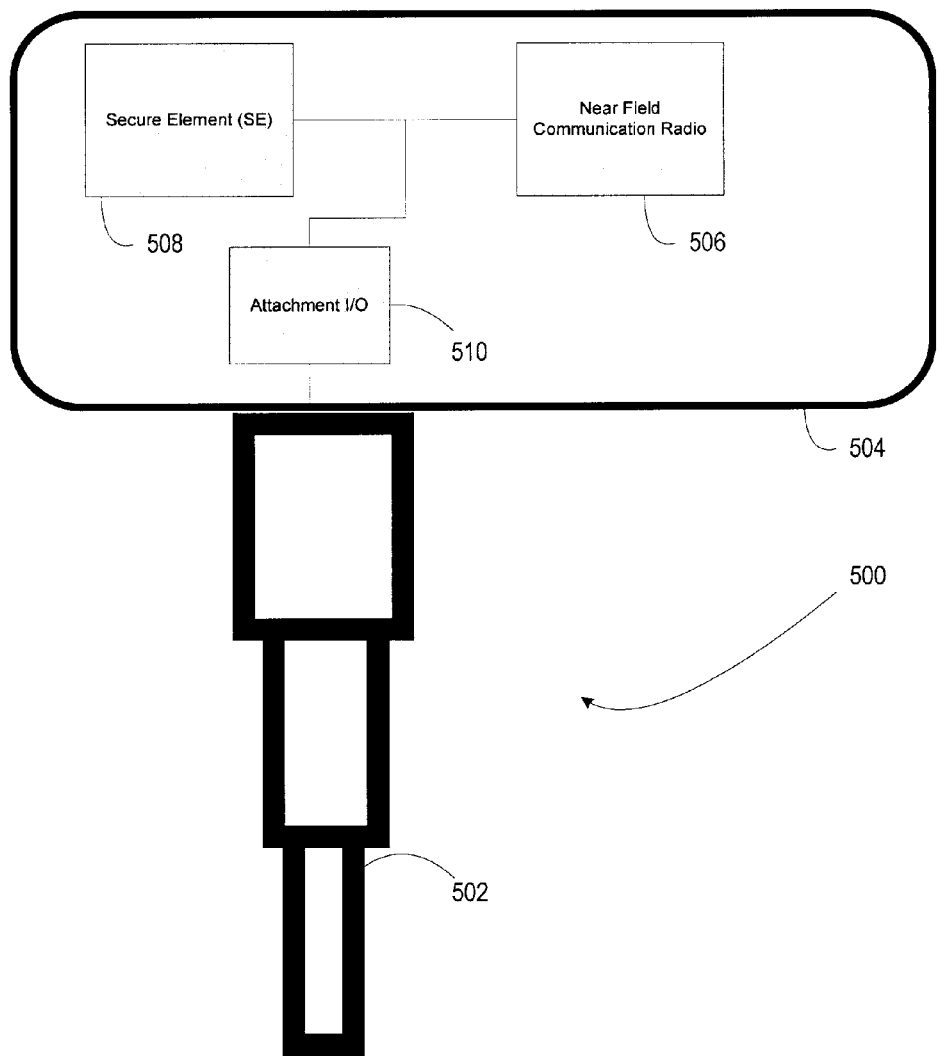
FIG. 5 depicts an exemplary embodiment of a contactless payment system.

FIG. 5 depicts one possible embodiment of the attachment 500. The attachment may comprise an audio jack plug 502 and a housing 504. The housing 504 may be produced from plastic, metal alloy, or any other suitable substance. The housing 504 may contain a near field communication radio 506, a secure element 508, and an input/output module 510. In one embodiment, near field communication radio 506, secure element 508, and an input/output module 510 may all be combined into one chip, separated onto multiple chips or circuits, or any other possible combination. The near field communication radio 506 and secure element 508 may be connected in parallel, in series, or any other possible combination. The near field communication radio 506 and secure element 508 may each maintain a connection to the input/output module 510 if desired. In various embodiments, only one of near field communication radio 506 and secure element 508 may maintain a connection to the input/output module 510 to enhance security. Near field communication radio 506 may comprise one unit, or a separate antenna and NFC controller. Near field communication radio 506 and secure element 508 may be connected, for example, via a Single Wire Protocol (SWP) interface, S2C interface, etc. Secure element 508 may comprise a universal integrated circuit card (UICC), a secure digital or other memory card, SIM card, microcontroller, or any other possible implementation. The secure element may comprise one or multiple computer processors. The secure element may comprise one or multiple error detection systems, tamperproof storage modules, execution memory modules. Secure element 508 may represent multiple secure elements used to isolate various applications and provide additional security. Secure element 508 may optionally be removable to facilitate ease of use. Input/output module 510 may be capable of decoding audio data for use in the attachment. Input/output module 510 may be capable of encoding standard data for output through the audio jack plug 502. Input/output module 510 may comprise one module or multiple modules, and may be optionally combinable with one or both the secure element 508 and near field communication radio 506. Input/output module 510 may be capable of communicating with the mobile device by using a host controller interface. For example and not by way of limitation, input/output module 510 may use a Java Contactless Communication API (JSR 257), a Java Security and Trust Services API (JSR 177), Security and Trust Services API (SATSA), an ISO/IEC 7816 compatible interface, or any other acceptable means or protocol to communicate with the mobile device or any other component. Additionally, the attachment may provide additional features deemed useful, such as, for example, a display, signal light, speaker, additional input/output mechanisms, or other advantageous features.

Figure 6:
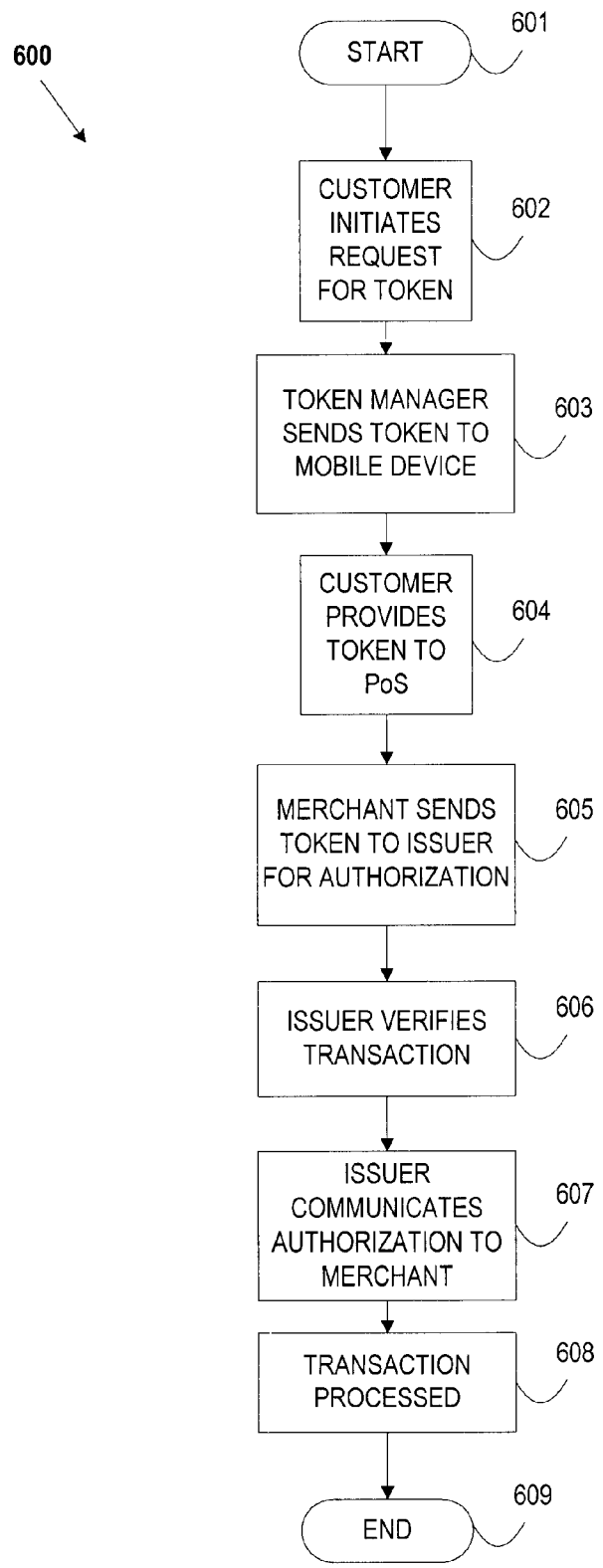
FIG. 6 depicts an exemplary embodiment of a contactless payment method.

FIG. 6 depicts an exemplary method 600 for an approach to contactless payment. Method 600 utilizes tokens to enable contactless payment, and may be used in conjunction with the attachment, or may not be used at all. Note that the attachment and any other items described herein do not require the use tokens and tokens may optionally be used. Method 600 may begin in block 601.

In block 602, a customer may initiate a request for a token. In various embodiments, a customer may "tap" the mobile device and attachment to a PoS device, for example to initiate the request for a token at the time of a transaction. A customer may also initiate a request by requesting a token through a mobile payments application using a mobile device. Also, the token used in FIG. 6 may be account information that would normally be transferred in a simple credit card swipe transaction, already stored in the attachment, and the request may be handled within the attachment and mobile device environment.

In block 603, the token may be sent to a customer's mobile device. For example, a token manager may send a token to mobile device using a communication network and/or various communications similar to those described in FIG. 3. Also, the transfer of the token may be handled within the attachment and mobile device environment.

In block 604, a customer may provide the token to a PoS device. This token could be provided at the time of purchase. Upon receipt of the token, the merchant, using a payment processing system, for example, in cooperation with the PoS device, may format the token into a data format that may be utilized by one of the various authorization networks. For example, an exemplary 6-digit token may be inserted into one of the "tracks" of data utilized by the Visa 0 network to transmit and receive data. As noted above, the token provided may also represent simple account information such as the information that would be transferred by a credit card swipe transaction.

In block 605, the merchant may send the token to the issuer for authorization. For example, the merchant may send a token to the issuer using a communication network and/or various communications similar to those described in FIG. 3. As noted above, the token provided may also represent simple account information such as the information that would be transferred by a credit card swipe transaction.

In block 606, the issuer and/or token manager may verify the token and/or transaction utilizing the token. For example, the issuer may use the token to look up the account of the customer and determine whether the transaction should be authorized. As noted above, the token provided may also represent simple account information such as the information that would be transferred by a credit card swipe transaction. The issuer and/or token manager may also check the token against certain parameters to determine, for example, whether the transaction complies with certain parameters or the token has expired. In various embodiments, the issuer and/or token manager may receive and utilize location information or identification information associated with the customer's mobile device to determine whether to authorize the transaction. For example, the issuer and/or token manager may receive and utilize the MAC address of a mobile device and/or the merchant location to determine whether to authorize the transaction.

In block 607, the issuer and/or token manager may communicate the authorization to the merchant.

In block 608, the transaction may be processed. At block 609, the method may end.

Figure 7:
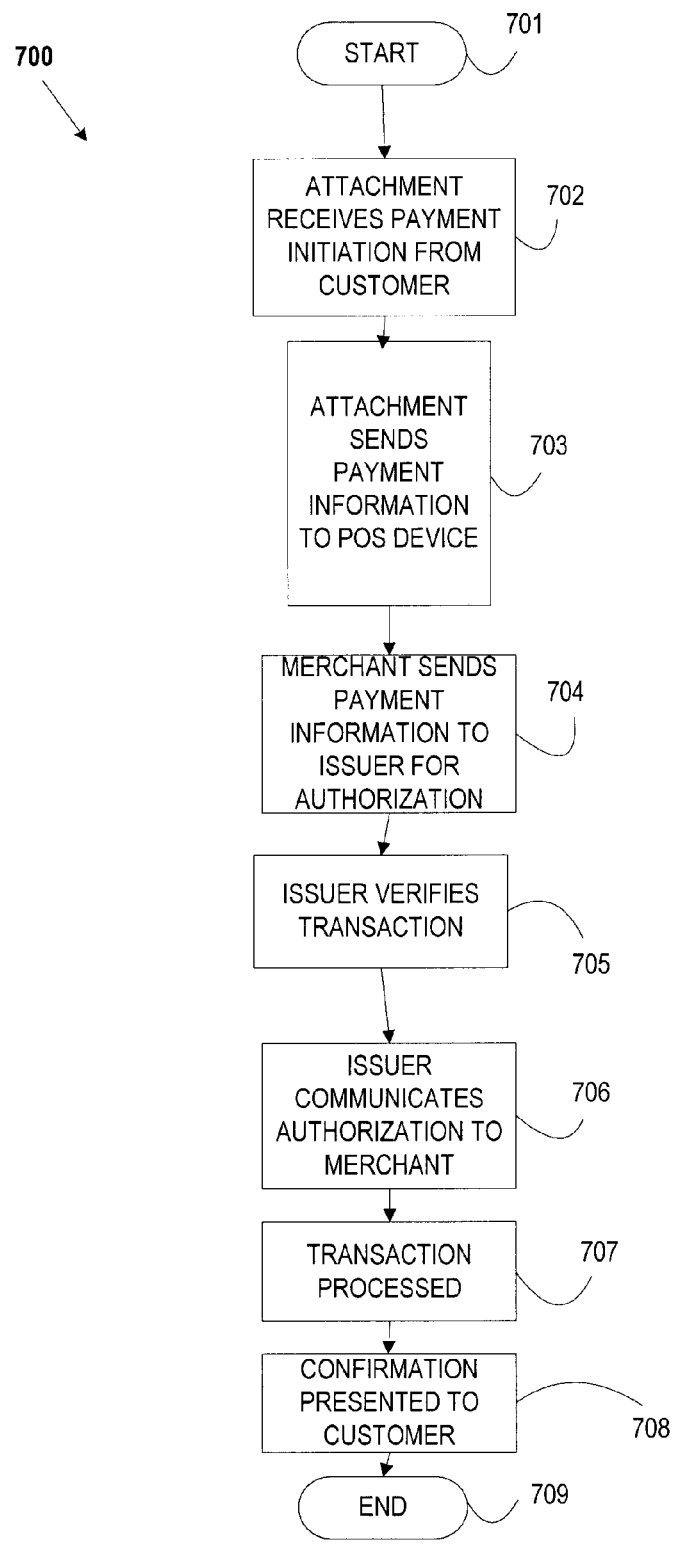
FIG. 7 depicts an exemplary embodiment of a contactless payment method.

FIG. 7 depicts an exemplary method 700 for an approach to contactless payment. Method 700 may begin in block 701.

In block 702, a customer may initiate a payment. In various embodiments, a customer may utilize software on the mobile device to signal that a payment is to be made. For example, the customer may select an option to pay, or the customer may be presented with various options for payment, including, for example, the account the customer desires to use for the transaction, the type of transaction, the amount of the transaction, the time that the attachment should 'wait' for the transaction, and/or the merchant targeted in the transaction. Also, the attachment may be enabled for payments through a button or other interface on the attachment itself, or the attachment may always accept payments without user interaction beyond placing the mobile device and/or attachment near a PoS device or other sensor.

In block 703, the attachment may send payment information to the PoS device via the near field communication techniques described above. In an exemplary embodiment, the payment information may comprise, encrypted information, information similar to that transmitted in a credit card swipe transaction, or a message the payment process is ongoing. The payment information may comprise a dynamic card verification value (CVV3) generated at the time of the transaction. For example, the system may transmit encrypted information representing a customer's account with a financial institution to the PoS device. The payment information transmitted to a PoS device may be a message stating that the transaction is processing, and the mobile device may communicate further information to either the PoS device or another party or device via a non-NFC connection. Upon receipt of the payment information, the merchant, using a payment processing system, for example, in cooperation with the PoS device, may format the payment information into a data format that may be utilized by one of the various authorization networks. For example, the payment information may be inserted into one or more of the "tracks" of data utilized by the Visa® network to transmit and receive data. As noted above, the information provided may also represent simple account information such as the information that would be transferred by a credit card swipe transaction.

In block 704, a merchant may send the payment information to issuer for authorization. For example, the merchant may send a token to the issuer using a communication network and/or various communications similar to those described in FIG. 3. In an exemplary embodiment, the information sent to the issuer may comprise a token as described above, encrypted information representing a financial account, the amount of the transaction, and/or other information necessary to initiate a payment. The information may be sent as received from the attachment/mobile device or may be formatted as described above.

In block 705, the issuer may verify the payment information. For example, the issuer may use the payment information to look up the account of the customer and determine whether the transaction should be authorized. The issuer and/or token manager may also check the payment information against certain parameters to determine, for example, whether the transaction complies with certain parameters or the token has expired. In various embodiments, the issuer may receive and utilize location information or identification information associated with the customer's mobile device to determine whether to authorize the transaction. For example, the issuer may receive and utilize the MAC address of a mobile device and/or the merchant location to determine whether to authorize the transaction.

In block 706, the issuer may communicate the authorization to the merchant. In block 707, the transaction may be processed. The merchant or PoS device may send a payment confirmation message to the attachment.

In block 708, the system may present payment confirmation to the customer. The confirmation may be presented via the display of the mobile device, the speaker of the mobile device, a signal lamp on the mobile device, or by a light or sound message from the attachment itself. The confirmation may comprise a simple notice that the transaction was completed, and may optionally provide information summarizing the transaction, such as, for example, the amount of the transaction, the account used for the transaction, the balance of the account used for the transaction, the merchant name, and/or any other useful information. At block 709, the method may end.

Figure 8:
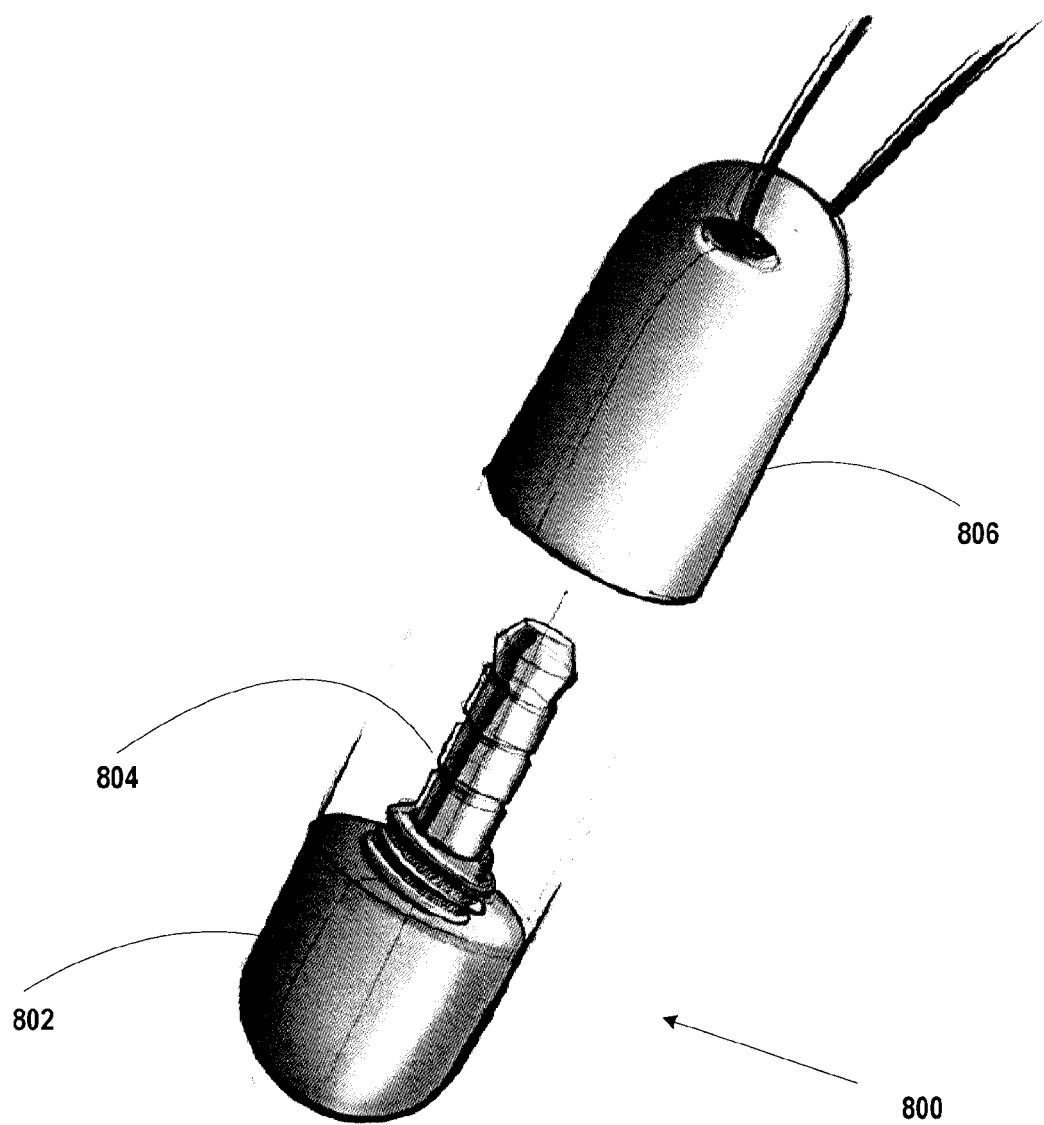
FIG. 8 depicts an exemplary embodiment of a contactless payment system.

FIG. 8 depicts one possible embodiment of the attachment 800. Attachment 800 may comprise an audio jack plug 804 and a housing 802. Attachment 800 may be packaged with or otherwise function with storage unit 806. In an exemplary embodiment, storage unit 806 may comprise a plastic body configured to receive a threaded version of attachment 800. Storage unit 806 may further comprise a hole, loop, or other portion capable of attaching to a keychain, lanyard, or otherwise be carried or held by a user.

Figure 9:
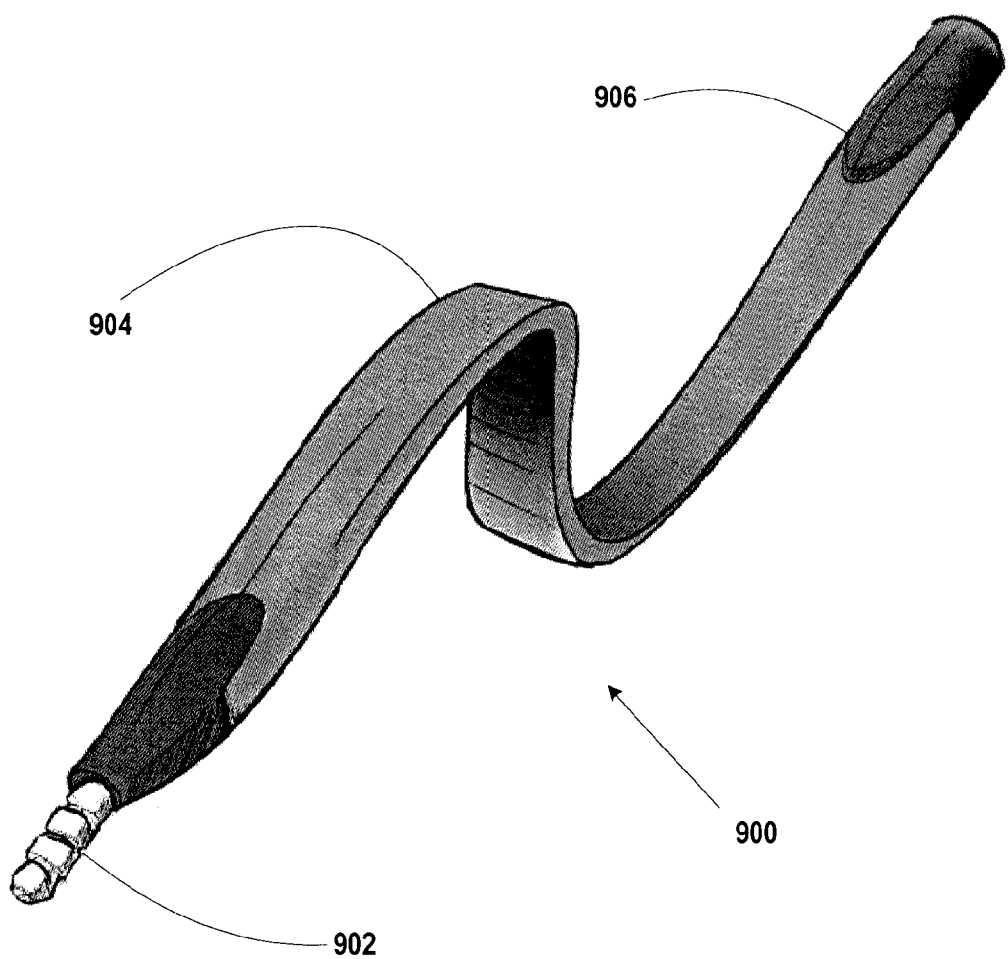
FIG. 9 depicts an exemplary embodiment of a contactless payment system.

FIG. 9 depicts one possible embodiment of the attachment 900. The attachment may comprise an audio jack plug 902, a ribbon 904, and an audio jack 906. Ribbon 904 may contain a near field communication antenna, secure element, and/or an input/output circuit. Attachment 900 may be elongated to mimic or otherwise function in conjunction with existing headphone cords. Audio jack 906 may be configured to receive a headphone audio plug and serve as the user interface of a "pass-through" connection.

Figure 10A:
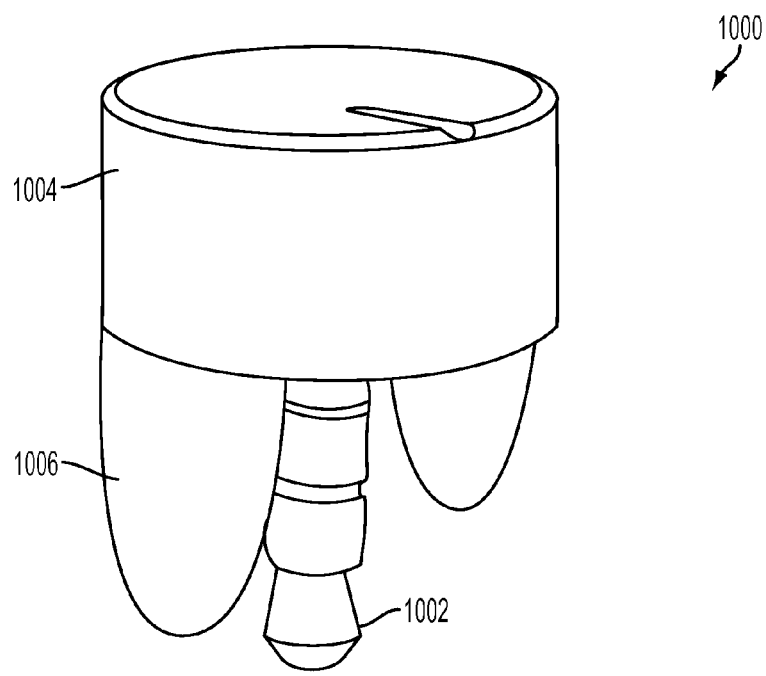
FIG. 10a depicts an exemplary embodiment of a contactless payment system.
Figure 10B:
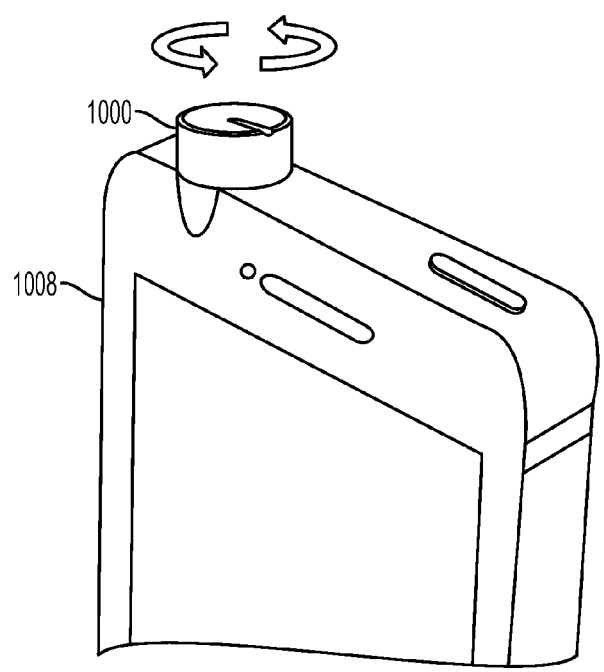
FIG. 10b depicts an exemplary embodiment of a contactless payment system.

FIG. 10A depicts one possible embodiment of the attachment 1000. Attachment 1000 may comprise an audio jack plug 1002 and housing 1004. Housing 1004 may be formed to function as a knob or other movable piece. Housing 1004 may contain an activation circuit comprising a switch or other mechanism capable of sending a signal when housing 1004 is rotated to a certain position or other interaction is completed by a user. Attachment 1000 may optionally have one or more flanges 1006. The one or more flanges 1006 may extend beyond at least one edge of a device 1008 to enable movement or rotation of housing 1004 without moving entire attachment 1000, as shown in FIG. 10B.

Figure 11A:
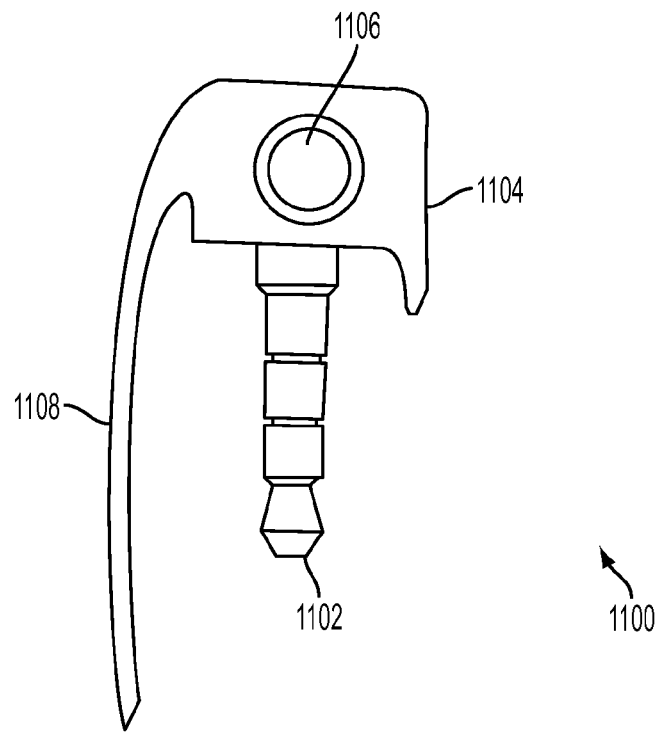
FIG. 11a depicts an exemplary embodiment of a contactless payment system.
Figure 11B:
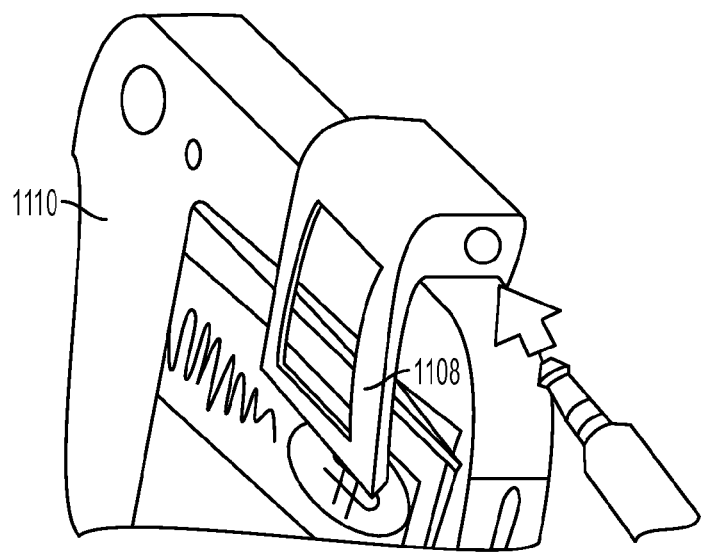
FIG. 11b depicts an exemplary embodiment of a contactless payment system.

FIG. 11A depicts one possible embodiment of the attachment 1100. Attachment 1100 may comprise an audio jack plug 1102, housing 1104, audio jack 1106, and clip extension 1108. Clip extension 1108 may extend beyond one or more edges of device 1110, and function to hold additional objects, cash, cards, or other desirable items, as shown in FIG. 11B.

Figure 12:
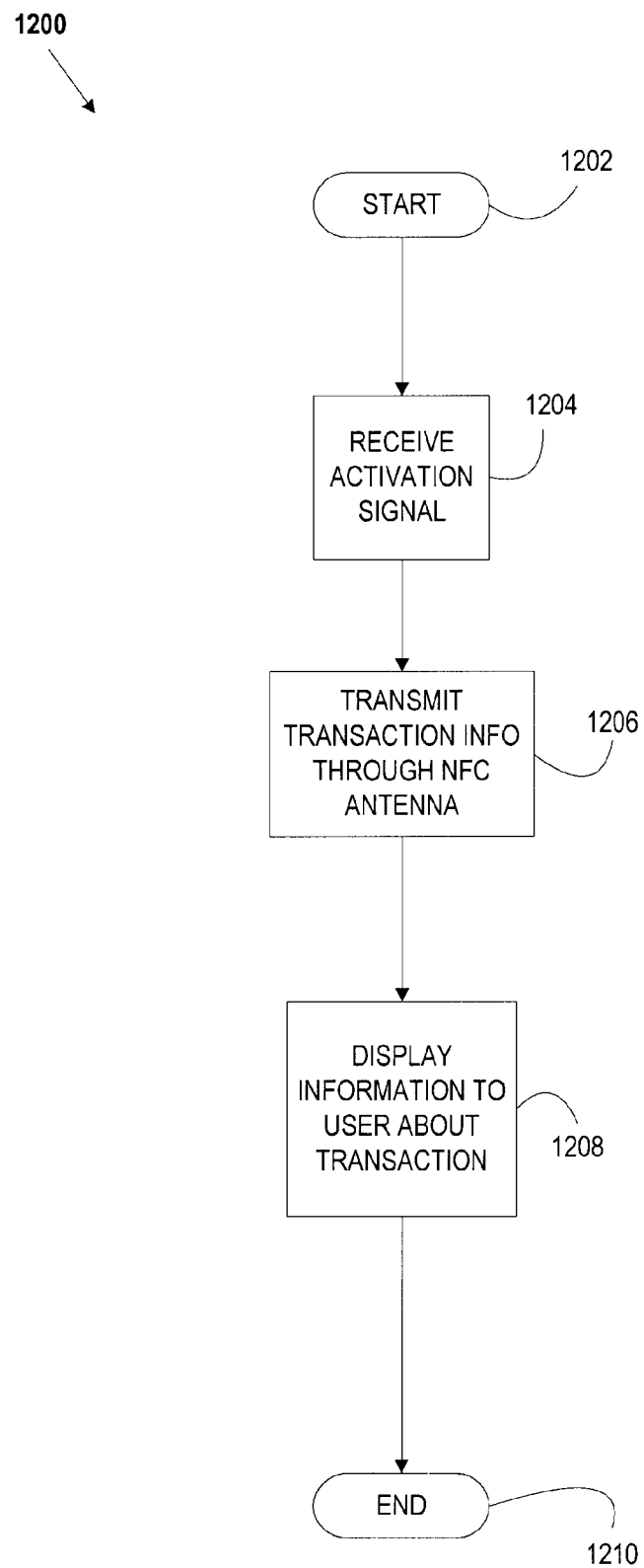
FIG. 12 depicts an exemplary embodiment of a contactless payment method.

FIG. 12 depicts an exemplary method 1200 for an approach to contactless payment. Method 1200 may begin in block 1202. In step 1204, an activation signal may be received at one or more computer processors. The activation signal may indicate the entry of a PIN code, the rotation of a knob, the push of a button, a defined switch position, or other signal indicating that the attachment should be activated to complete an operation. In step 1206, transaction information may be transmitted through an NFC antenna. In step 1208, information about the transaction may be displayed to a user on an electronic display. The information may be displayed on any display capable of showing information, for example and not by way of limitation, a liquid crystal display, light emitting diode display, plasma display, organic light emitting diode display, light projection, laser, carbon nanotubes, holographic display, or other segment display, full-area two dimensional display, and/or three dimensional display.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A contactless payment attachment, comprising:
a housing that protects components of the contactless payment attachment;
an International Organization for Standardization/International Electrotechnical Commission 14443 (ISO/IEC 14443) compliant secure element within the housing that securely stores an account number upon account provisioning which is used to identify a financial account and is transmitted from the contactless payment attachment when the contactless payment attachment is used during a mobile payment transaction involving the financial account;
a radio frequency interface connected to the ISO/IEC 14443 compliant secure element within the housing, wherein the radio frequency interface includes a near field communication antenna that establishes a communication link between the contactless payment attachment and a point of sale device and transmits the account number to the point of sale device via a radio frequency carrier frequency when conducting the mobile payment transaction involving the financial account;
an input/output interface within the housing that enables an audio channel communication link between the contactless payment attachment and a mobile device, wherein the input/output interface includes an audio encoder/decoder that encodes data to be transmitted to the mobile device via the audio channel communication link as attachment audio data and decodes audio data transmitted from the mobile device via the audio channel communication link, and wherein the input/output interface receives an account provisioning signal that includes the account number;
an approximately 3.5 millimeter 4 pole standard audio plug that is operably connected to the input/output interface, protrudes from the housing, connects the contactless payment attachment to an audio jack of the mobile device to enable establishment of the audio channel communication link, and is capable of providing power to the contactless payment attachment from the mobile device when the approximately 3.5 millimeter 4 pole standard audio plug is connected to the audio jack on the mobile device;
a host controller interface within the housing that controls certain operations of the contactless payment attachment, including transmission of encoded data to the mobile device via the audio channel communication link and transmission of the account number to the point of sale device via the radio frequency carrier frequency;
a power source that supplies power to the ISO/IEC 14443 compliant secure element, radio frequency interface, input/output interface, and host controller interface in a manner that enables the contactless payment attachment to be self-powered; and
a keychain that includes an audio plug receptacle that is capable of receiving the approximately 3.5 millimeter 4 pole standard audio plug in a manner that couples the housing to the keychain and a keychain portion that enables attachment of the keychain to another object.

2. The contactless payment attachment of claim 1, wherein the radio frequency carrier frequency is approximately 13.56 MHz.

3. The contactless payment attachment of claim 1, wherein the housing further includes a coupling mechanism that engages with the keychain to couple the housing to the keychain.

4. The contactless payment attachment of claim 1, wherein the communication link between the contactless payment attachment and a point of sale device is ISO/IEC 14443 compliant.

5. The contactless payment attachment of claim 4, wherein the communication link between the contactless payment attachment and a point of sale device is MIFARE compliant.

6. The contactless payment attachment of claim 1, wherein the radio frequency interface is ISO/IEC 14443 compliant.

7. The contactless payment attachment of claim 6, wherein the radio frequency interface is MIFARE compliant.

8. The contactless payment attachment of claim 6, wherein the ISO/IEC 14443 compliant secure element includes at least one computer processor and at least one secure storage module.

9. The contactless payment attachment of claim 1, wherein the financial account is a credit card account.

10. The contactless payment attachment of claim 9, wherein the financial transaction is a credit card transaction.

11. The contactless payment attachment of claim 1, further comprising an audio jack that extends into the housing to receive a standard audio plug, the audio jack being operably connected to the input/output interface within the housing to create an audio transmission channel between the approximately 3.5 millimeter 4 pole standard audio plug and the audio jack.

12. The contactless payment attachment of claim 11, wherein the host controller interface suspends transmission of an audio signal during use of the near field communication antenna.

13. A method for initializing an attachment, comprising the steps of:
receiving, via a network and within a mobile application associated with a financial institution executing on a mobile device, a secure element provisioning signal from a trusted service manager of the financial institution, the secure element provisioning signal including an account number that is used to identify an account at the financial institution and is transmitted from the attachment when processing a payment transaction relating to the account, wherein the attachment includes the contactless payment attachment of claim 1.

14. The method of claim 13, wherein the account is a credit card account.

15. The method of claim 14, wherein the payment transaction is a credit card transaction.

16. The method of claim 13, wherein the account is a debit card account.

17. The method of claim 14, wherein the payment transaction is a debit card transaction.

18. The method of claim 15, further comprising processing a transaction relating to the account.

* * * * *